(12) United States Patent
Wang

(10) Patent No.: US 9,685,059 B2
(45) Date of Patent: Jun. 20, 2017

(54) DEVICES AND METHODS FOR PROVIDING HEAT-SOURCE ALERTS

(71) Applicant: Google Inc., Mountain View, CA (US)

(72) Inventor: Liang-Yun Wang, Sunnyvale, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

(21) Appl. No.: 14/621,272

(22) Filed: Feb. 12, 2015

(65) Prior Publication Data
US 2016/0240060 A1 Aug. 18, 2016

(51) Int. Cl.
| G08B 17/12 | (2006.01) |
| G08B 29/18 | (2006.01) |
| H04L 12/64 | (2006.01) |
| G08B 21/02 | (2006.01) |
| G08B 21/18 | (2006.01) |

(52) U.S. Cl.
CPC ........... *G08B 17/12* (2013.01); *G08B 29/185* (2013.01); *H04L 12/6418* (2013.01); *G08B 21/02* (2013.01); *G08B 21/182* (2013.01)

(58) Field of Classification Search
CPC ...... G08B 17/00; G08B 21/182; G08B 21/22; G08B 29/18; G08B 29/185; G08B 29/24; G08C 19/04; G01K 3/005
See application file for complete search history.

(56) References Cited

U.S. PATENT DOCUMENTS

| 4,659,909 A | 4/1987 | Knutson |
| 5,945,017 A * | 8/1999 | Cheng ..................... F23D 14/76 219/446.1 |
| 8,063,872 B2 | 11/2011 | Forstall et al. |
| 8,682,952 B2 | 3/2014 | Kutzik et al. |
| 9,196,148 B1 * | 11/2015 | Hutz ..................... G08B 21/18 |

(Continued)

FOREIGN PATENT DOCUMENTS

| WO | WO 03/044755 A1 | 5/2003 |
| WO | WO 2013/023067 A2 | 2/2013 |

OTHER PUBLICATIONS

Coute-Cazalaa, Economical Smoke Detector Avoids False Alarms, Sep. 19, 2011, 6 pgs, http://electronicdesign.com/analog/economical-smoke-detector-avoids-false-alarms.

(Continued)

*Primary Examiner* — Leon-Viet Nguyen
(74) *Attorney, Agent, or Firm* — Morgan, Lewis & Bockius LLP

(57) ABSTRACT

A computing system receives blackbody radiation data from a thermal radiation sensor that is located in a room with a heat source and is directed at the heat source. An operating state of the heat source is determined using the blackbody radiation data. Occupancy data is received for a dwelling that includes the room with the heat source; using this data, an occupancy of the dwelling is determined, including an occupancy for the room. It is determined, using the operating state of the heat source and the occupancy of the dwelling, including the occupancy of the room, whether a heat-source alert condition that includes a first threshold time is met. If so, a heat-source alert is provided. A request of a first type is then received to cancel the heat-source alert. In response, the heat-source alert is canceled and the heat-source alert condition is modified.

20 Claims, 10 Drawing Sheets

(56) References Cited

U.S. PATENT DOCUMENTS

| | | | |
|---|---|---|---|
| 2004/0030531 A1 | 2/2004 | Miller et al. | |
| 2007/0132575 A1* | 6/2007 | Ellul | G08B 5/38 340/524 |
| 2013/0229278 A1* | 9/2013 | Davis | G08B 21/24 340/521 |
| 2015/0118630 A1* | 4/2015 | Ewell | H05B 1/0261 432/1 |

OTHER PUBLICATIONS

Fadell, U.S. Appl. No. 61/887,963, filed Oct. 7, 2013, 227 pgs.
Fisher, U.S. Appl. No. 13/632,142, filed Sep. 30, 2012, 56 pgs.
Infrared thermometer, wikipedia, accessed online Oct. 16, 2015, 5 pgs, http://en.wikipedia.org/wiki/Infrared_thermometer.
Smoke detector, wikipedia, accessed online Oct. 16, 2015, 8 pgs, http://en.wikipedia.org/wiki/Smoke_detector.

* cited by examiner

DEVICES AND METHODS FOR PROVIDING HEAT-SOURCE ALERTS

TECHNICAL FIELD

This relates generally to heat-source monitoring, including but not limited to providing heat-source alerts.

BACKGROUND

Heat sources (e.g., stoves and fireplaces) in a structure present a risk of fire. Sensors may be used to monitor heat sources and provide an alert in the event of a fire and/or the presence of excessive heat. Sometimes a sensor will provide an unnecessary alert (e.g., a false alarm). Repeated instances of unneeded alerts can lead a user to ignore or disable the alerts, which defeats the purpose of the heat-source monitor and reduces user safety.

SUMMARY

Accordingly, there is a need for devices and methods for providing more accurate heat-source alerts, with fewer instances of unneeded alerts. Such devices and methods optionally complement or replace conventional devices and methods for providing heat-source alerts.

In accordance with some embodiments, a method is performed at a computing system. The method includes receiving blackbody radiation data from a thermal radiation sensor that is located in a room with a heat source and is directed at the heat source. An operating state of the heat source in the room is determined based at least in part on the received blackbody radiation data. Occupancy data is received for a dwelling that includes the room with the heat source. Based on the received occupancy data, an occupancy of the dwelling is determined. Determining the occupancy of the dwelling includes determining an occupancy for the room with the heat source. Based at least in part on the determined operating state of the heat source and the determined occupancy of the dwelling, including the occupancy of the room with the heat source, it is determined whether a heat-source alert condition is met. The heat-source alert condition includes a first threshold time. In accordance with a determination that the heat-source alert condition is met, a heat-source alert is presented or instructions to present a heat-source alert are sent. After presenting or sending instructions to present the heat-source alert, a request of a first type is received to cancel the heat-source alert. In response, the heat-source alert is canceled and the heat-source alert condition is modified.

In accordance with some embodiments, a computing system includes one or more processors and memory. The memory stores one or more programs configured to be executed by the one or more processors. The one or more programs include instructions for performing the operations of the method described above. In accordance with some embodiments, a non-transitory computer-readable storage medium has stored therein instructions which when executed by a computing system with one or more processors, cause the computing system to perform the operations of the method described above. In accordance with some embodiments, a computing system includes means for performing the operations of the method described above.

Thus, computing systems are provided with more accurate methods for giving heat-source alerts, with fewer instances of unneeded alerts. Such methods may complement or replace conventional methods for providing heat-source alerts.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

As noted above, there is a need for devices and methods for providing more accurate heat-source alerts, with fewer instances of unneeded alerts. Here, a computing system generates a heat-source alert in response to a determination that a heat source in a room is in a potentially unsafe condition. This determination is based at least in part on data from a thermal radiation sensor monitoring the heat source and also on occupancy data for a dwelling that includes the room. The combined thermal-radiation-sensor data and occupancy data may indicate, for example, that a room with a hot stove has been left unoccupied for a length of time that is considered unsafe. A safety hazard thus exists that merits a heat-source alert. The same hot stove in an occupied room, however, might not be considered a safety hazard that merits a heat-source alert.

Furthermore, the computing system adjusts the condition used to determine whether to provide a heat-source alert based on feedback from requests to cancel the heat-source alerts. For example, if an occupant's request to cancel a heat-source alert is of a type that indicates that the heat-source alert is a false alarm, the heat-source alert condition may be changed to reduce the likelihood of another false alarm (e.g., lengthening the amount of time that a room is unoccupied before sending a heat-source alert). Conversely, if an occupant's request to cancel a heat-source alert is of a type that indicates that the heat-source alert was proper, but should have been given sooner, the heat-source alert condition may be changed to shorten the amount of time that a room is unoccupied before sending a heat-source alert. Thus, the heat-source alert condition changes with time so that more accurate heat-source alerts are provided, with fewer instances of unneeded alerts or late alerts.

Figure 5:
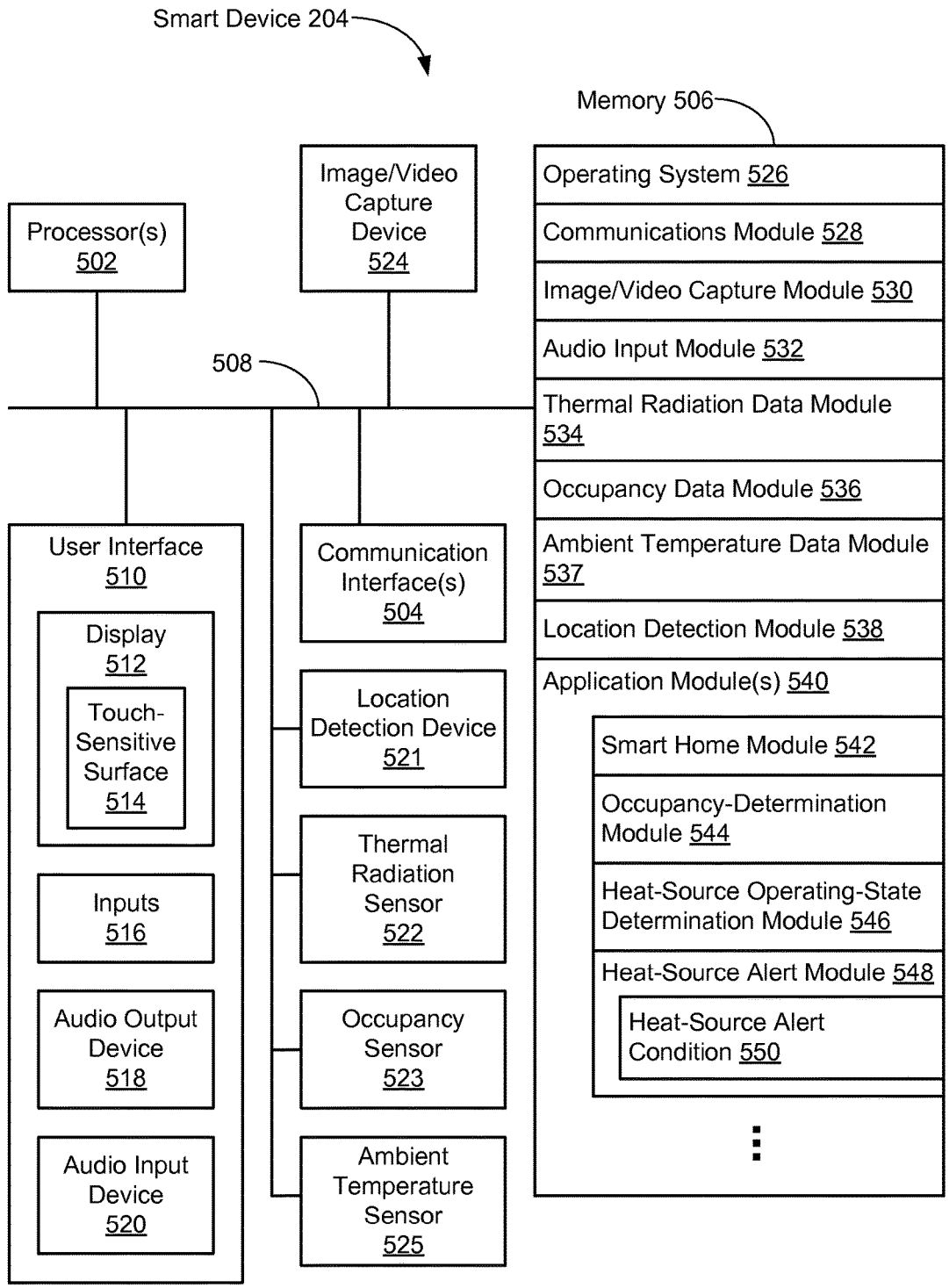
FIG. 5 is a block diagram illustrating an exemplary smart device in accordance with some embodiments.
Figure 6:
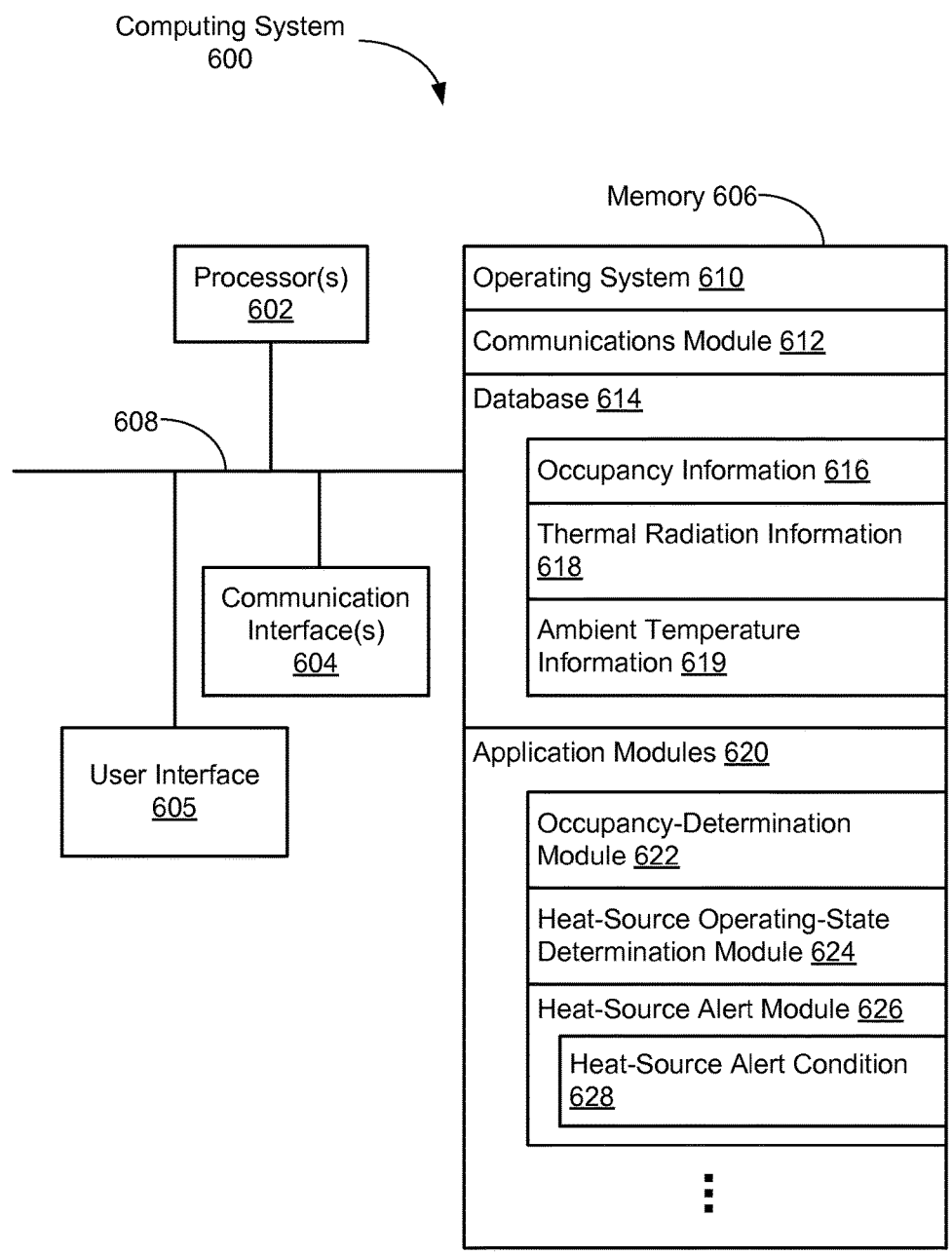
FIG. 6 is a block diagram illustrating an exemplary computing system in accordance with some embodiments.
Figure 7:
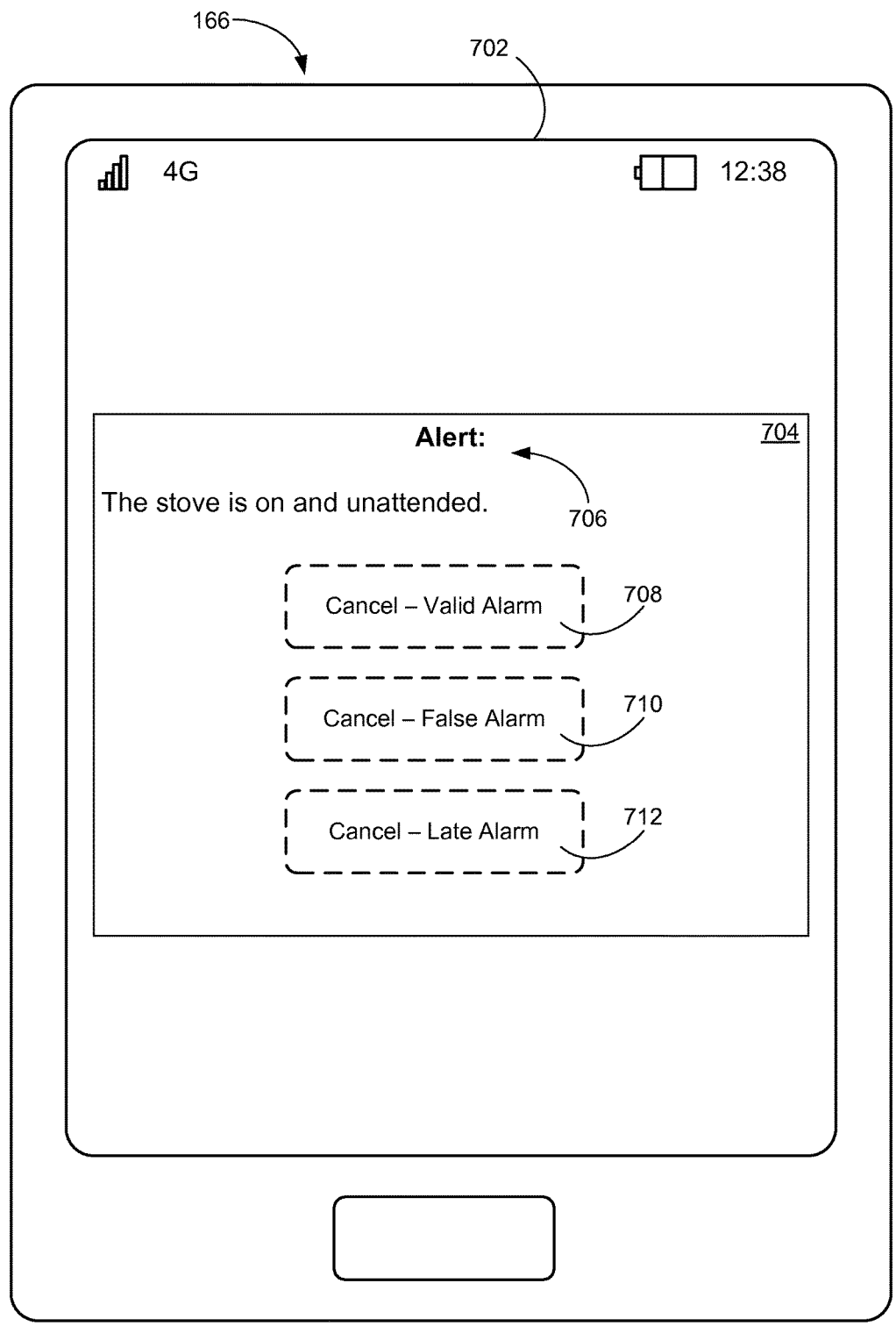
FIG. 7 illustrates an exemplary graphical user interface shown on an electronic device in accordance with some embodiments.
Figure 8:
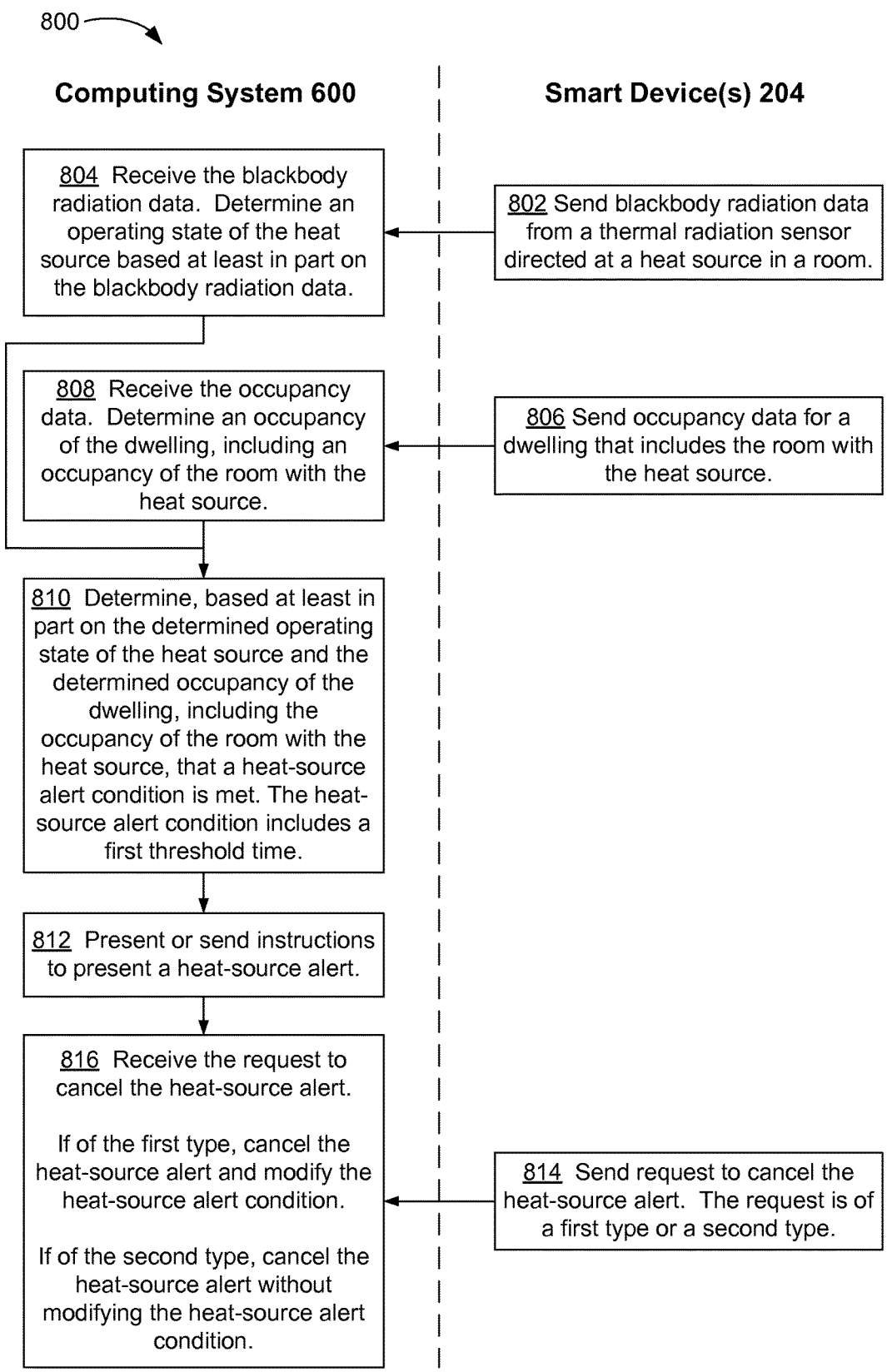
FIGS. 8, 9A, and 9B are flow diagrams illustrating methods of providing heat-source alerts in accordance with some embodiments.
Figure 9A:
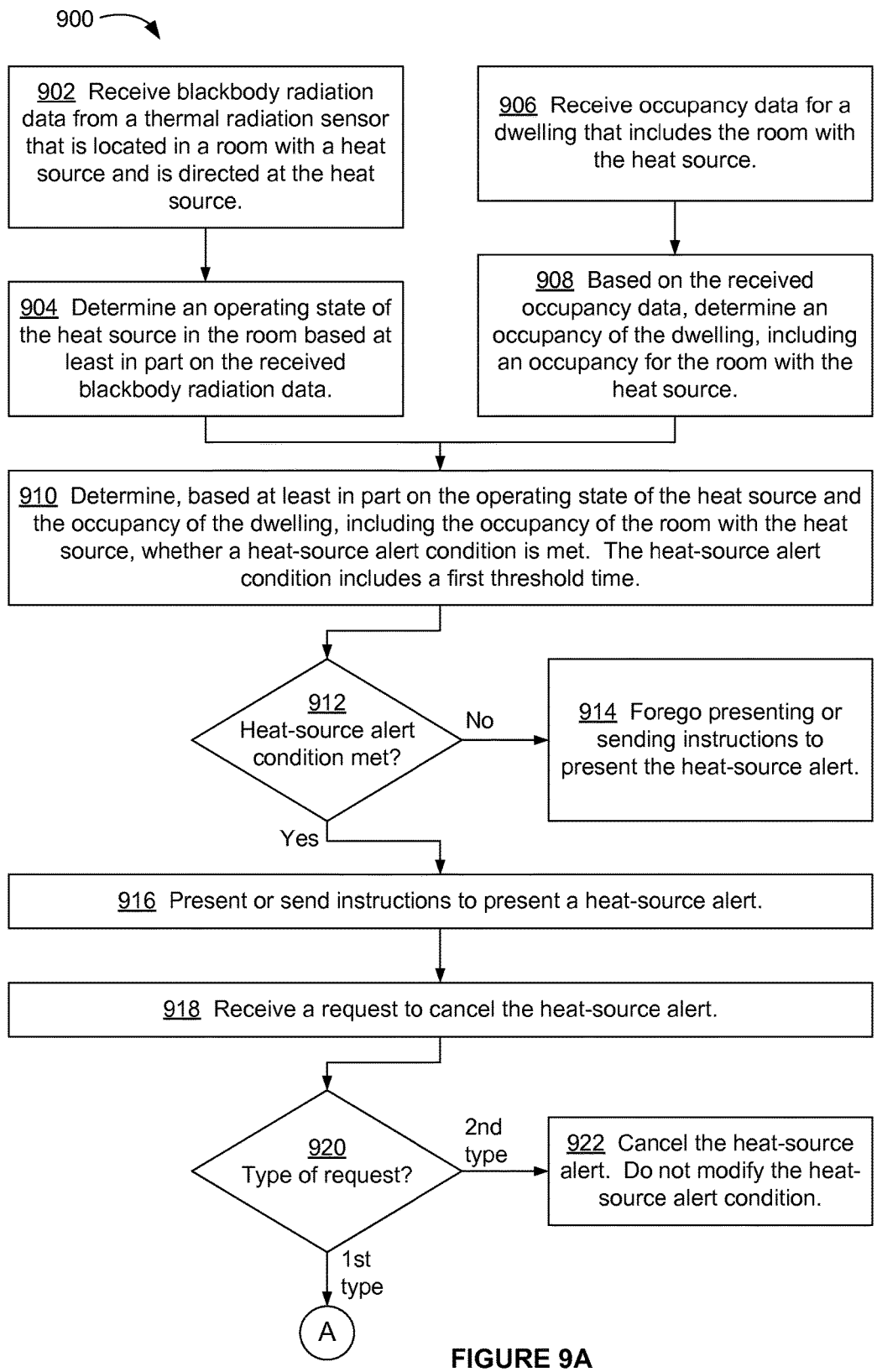
Figure 9B:
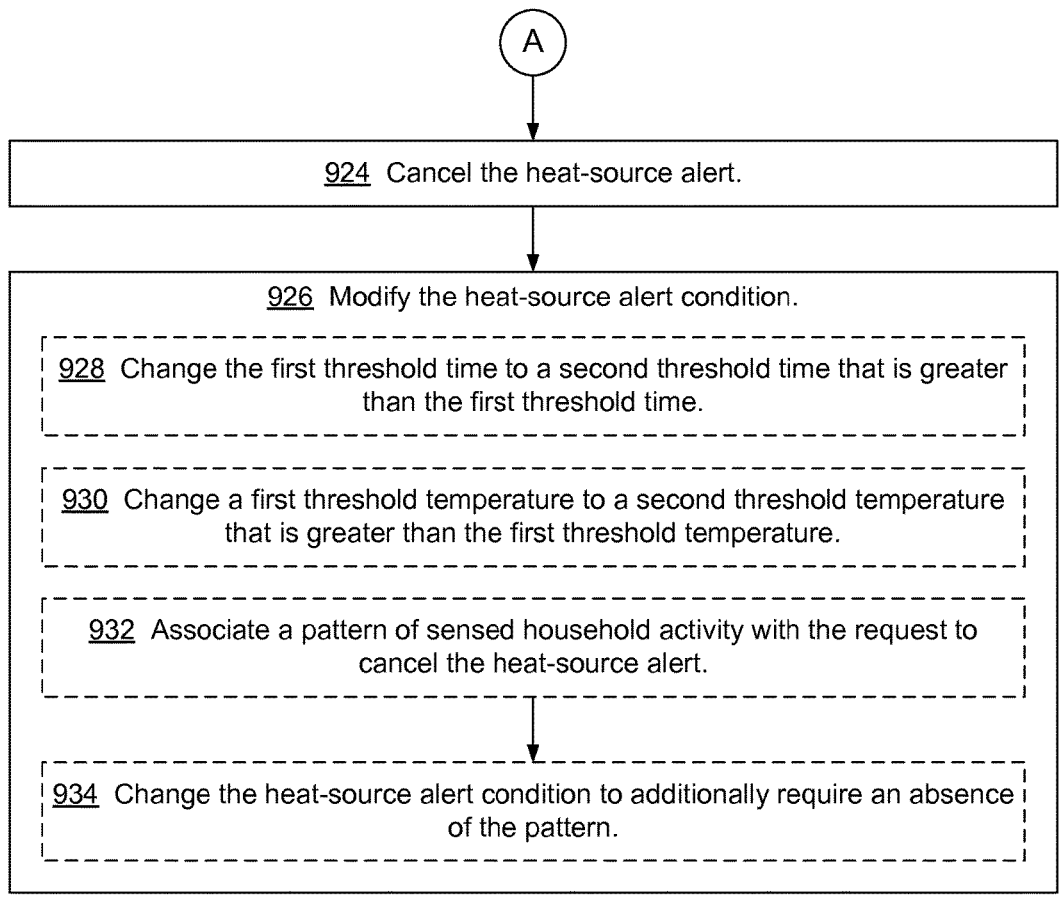

Below, FIGS. 1-4 provide an overview of exemplary smart home device networks and capabilities. FIGS. 5 and 6 are block diagrams of electronic devices included in or in communication with a smart home environment. FIG. 7 illustrates an exemplary user interface for displaying information relating to heat-source alerts. FIGS. 8, 9A, and 9B are flow diagrams illustrating methods of providing heat-source alerts in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first type of request could be termed a second type of request, and, similarly, a second type of request could be termed a first type of request, without departing from the scope of the various described embodiments. The first type of request and the second type of request are both types of requests, but they are not the same type of request.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the embodiments, such identity should not be construed in the descriptions that follow as necessarily limiting the scope of the present teachings to those particular individuals having those particular identities.

Figure 1:
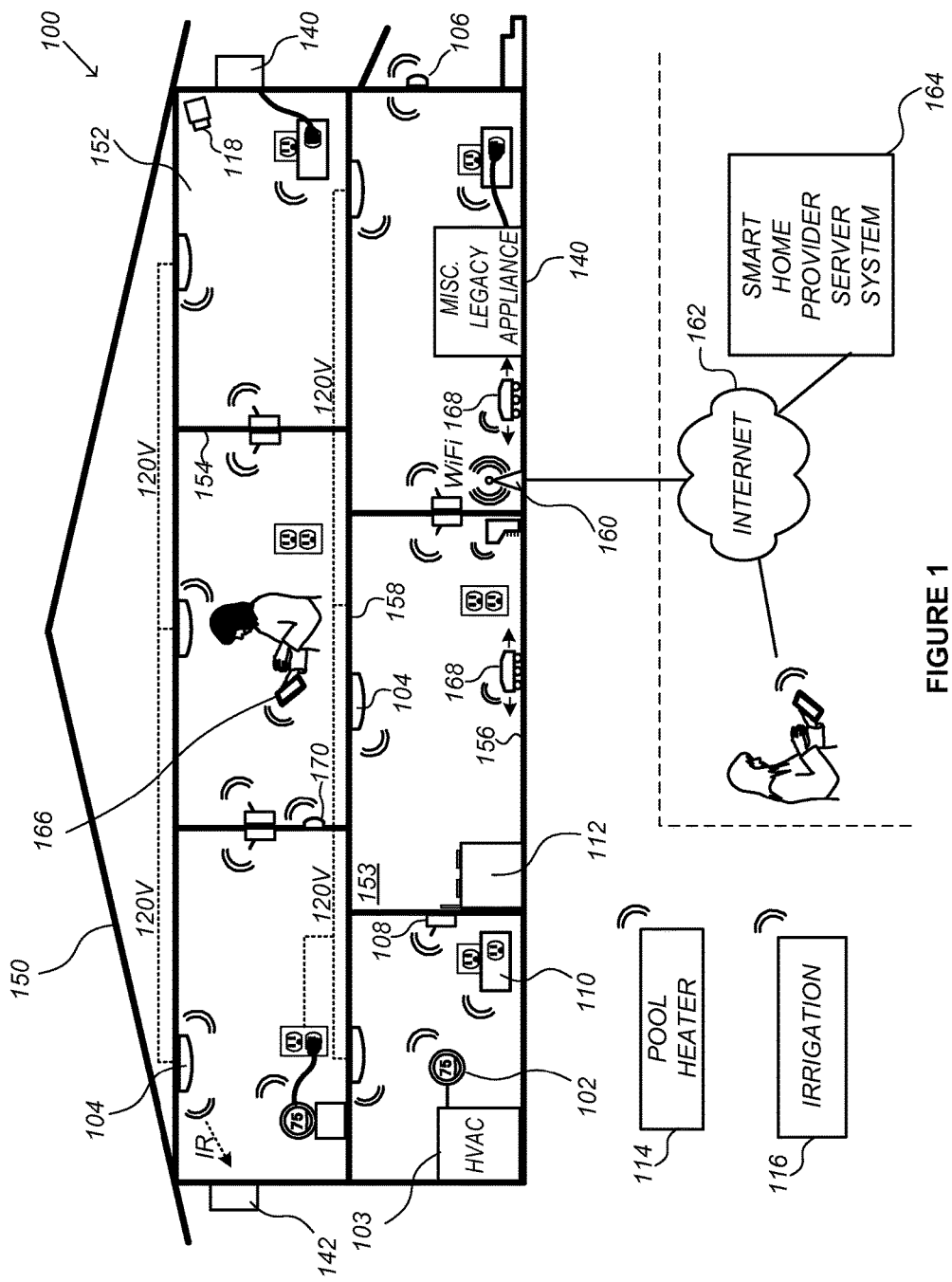
FIG. 1 is an exemplary smart home environment in accordance with some embodiments.

FIG. 1 is an exemplary smart home environment 100 in accordance with some embodiments. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some embodiments, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 106").

In some embodiments, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some embodiments, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some embodiments, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some embodiments, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some embodiments, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gate). The smart home environment 100 may additionally or alternatively include one or more other occupancy sensors (e.g., the smart doorbell 106, smart doorlocks, touch screens, IR sensors, microphones, ambient light sensors, motion detectors, smart nightlights 170, etc.). In some embodiments, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device (e.g., a mobile phone, such as a smart phone) 166. A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some embodiments, in addition to containing processing and sensing capabilities, devices 102, 104, 106, 108, 110, 112, 114, 116 and/or 118 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some embodiments, the smart devices serve as wireless or wired repeaters. In some embodiments, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some embodiments, a user is able to contact customer support using a smart device itself rather than needing to use other communication means, such as a telephone or Internet-connected computer. In some embodiments, software updates are automatically sent from the smart home provider server system 164 to smart devices (e.g., when available, when purchased, or at routine intervals).

Figure 2:
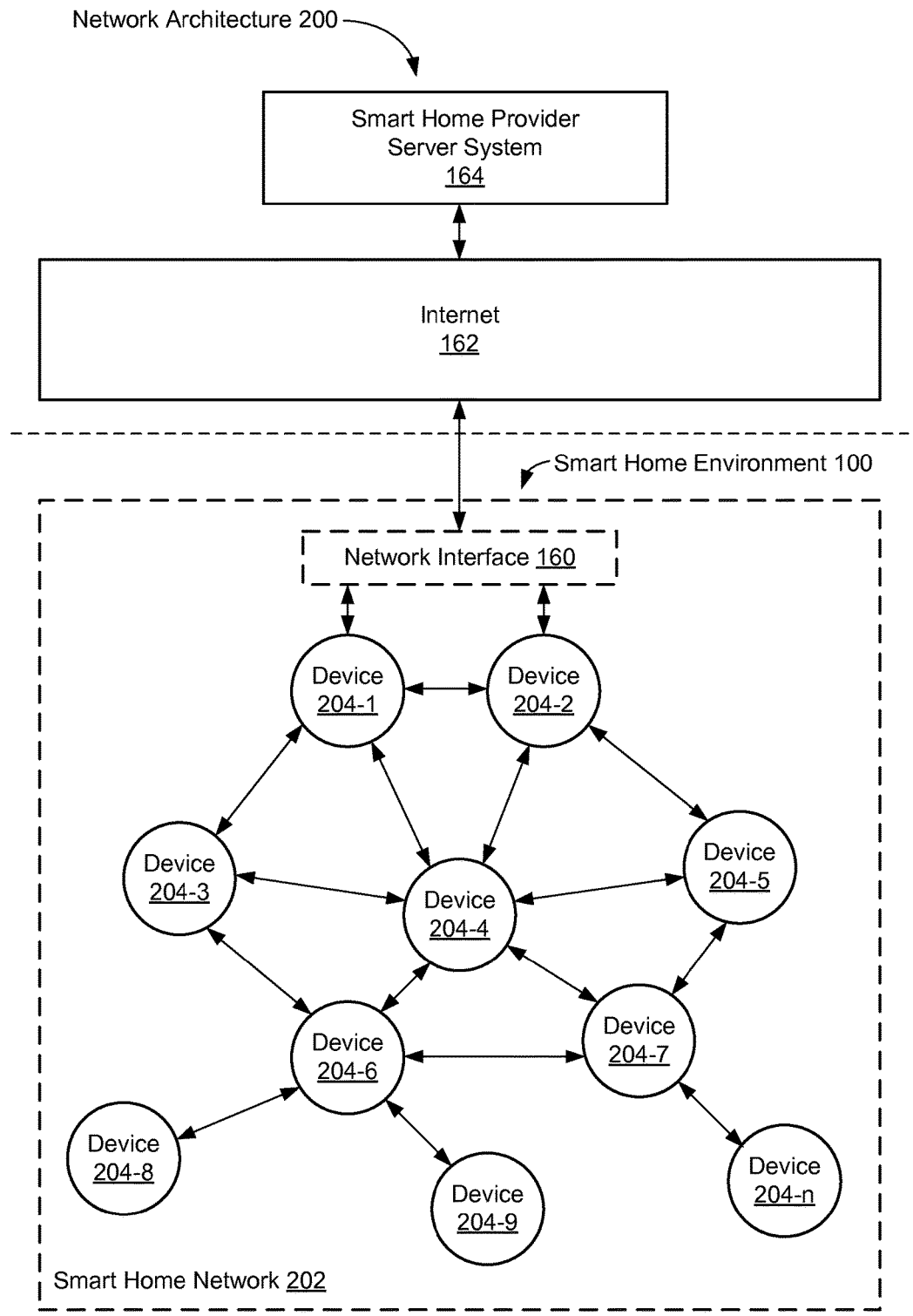
FIG. 2 is a block diagram illustrating an exemplary network architecture that includes a smart home network in accordance with some embodiments.

FIG. 2 is a block diagram illustrating an exemplary network architecture 200 that includes a smart home network 202 in accordance with some embodiments. In some embodiments, the smart devices 204 in the smart home environment 100 (e.g., devices 102, 104, 106, 108, 110, 112, 114, 116 and/or 118) combine to create a mesh network in smart home network 202. In some embodiments, one or more smart devices 204 in the smart home network 202 operate as a smart home controller. In some embodiments, a smart home controller has more computing power than other smart devices. In some embodiments, a smart home controller processes inputs (e.g., from smart devices 204, electronic device 166, and/or smart home provider server system 164) and sends commands (e.g., to smart devices 204 in the smart home network 202) to control operation of the smart home environment 100. In some embodiments, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some embodiments, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some embodiments, some low-power nodes are incapable of bidirectional communication. These low-power nodes send messages, but they are unable to "listen". Thus, other devices in the smart home environment 100, such as the spokesman nodes, cannot send information to these low-power nodes.

In some embodiments, some low-power nodes are capable of only a limited bidirectional communication. For example, other devices are able to communicate with the low-power nodes only during a certain time period.

As described, in some embodiments, the smart devices serve as low-power and spokesman nodes to create a mesh network in the smart home environment 100. In some embodiments, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some embodiments, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some embodiments, the mesh network enables the smart home provider server system 164 to regularly receive data from most or all of the smart devices in the home, make inferences based on the data, facilitate state synchronization across devices within and outside of the smart home network 202, and send commands back to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some embodiments, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, in some embodiments, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore may include more power-consuming components, such as one or more communication chips capable of bidirectional communication in a variety of protocols.

In some embodiments, the smart home environment 100 includes service robots 168 (FIG. 1) that are configured to carry out, in an autonomous manner, any of a variety of household tasks.

Figure 3:
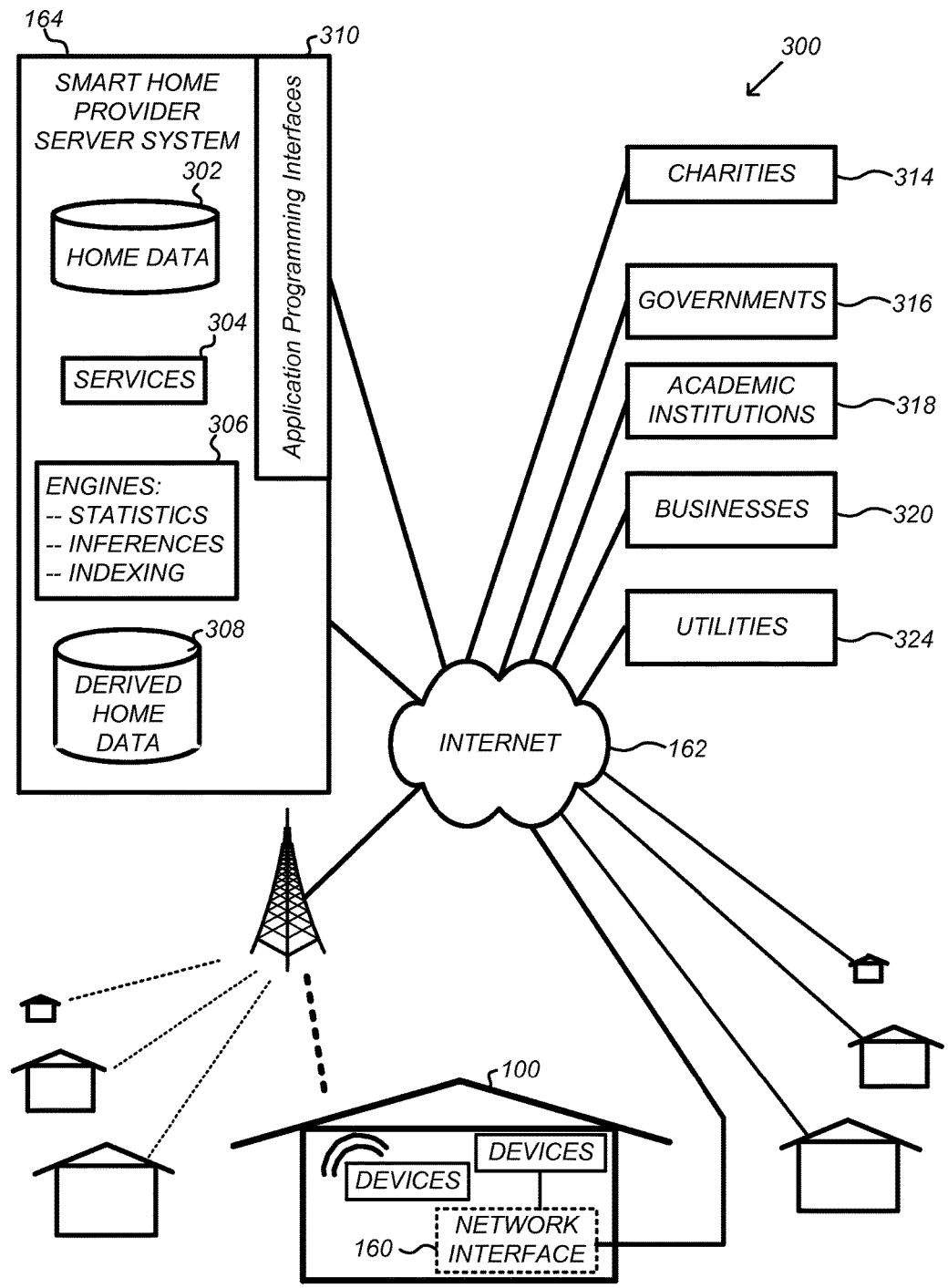
FIG. 3 illustrates a network-level view of an extensible devices and services platform with which the smart home environment of FIG. 1 is integrated, in accordance with some embodiments.

FIG. 3 illustrates a network-level view of an extensible devices and services platform with which the smart home environment of FIG. 1 is integrated, in accordance with some embodiments. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub, or an intelligent, dedicated whole-home controller node), or through any combination thereof.

In some embodiments, the devices and services platform 300 communicates with and collects data from the smart devices of the smart home environment 100. In addition, in some embodiments, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Exemplary collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some embodiments, the smart home provider server system 164 provides one or more services 304 to smart homes and/or third parties. Exemplary services 304 include, without limitation, software updates, customer support, sensor data collection/logging, remote access, remote or distributed control, and/or use suggestions (e.g., based on collected home data 302) to improve performance, reduce utility cost, increase safety, etc. In some embodiments, data associated with the services 304 is stored at the smart home provider server system 164, and the smart home provider server system 164 retrieves and transmits the data at appropriate times (e.g., at regular intervals, upon receiving a request from a user, etc.).

In some embodiments, the extensible devices and services platform 300 includes a processing engine 306, which may be concentrated at a single server or distributed among several different computing entities without limitation. In some embodiments, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some embodiments, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some embodiments, use statistics, use statistics relative to use of other devices, use patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some embodiments, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some embodiments, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications, such as web applications or mobile applications, that integrate with the smart home provider server system 164 to provide services and information to users. Such programs and applications may be, for example, designed to help users reduce energy consumption, to pre-emptively service faulty equipment, to prepare for high service demands, to track past service performance, etc., and/or to perform other beneficial functions or tasks.

Figure 4:
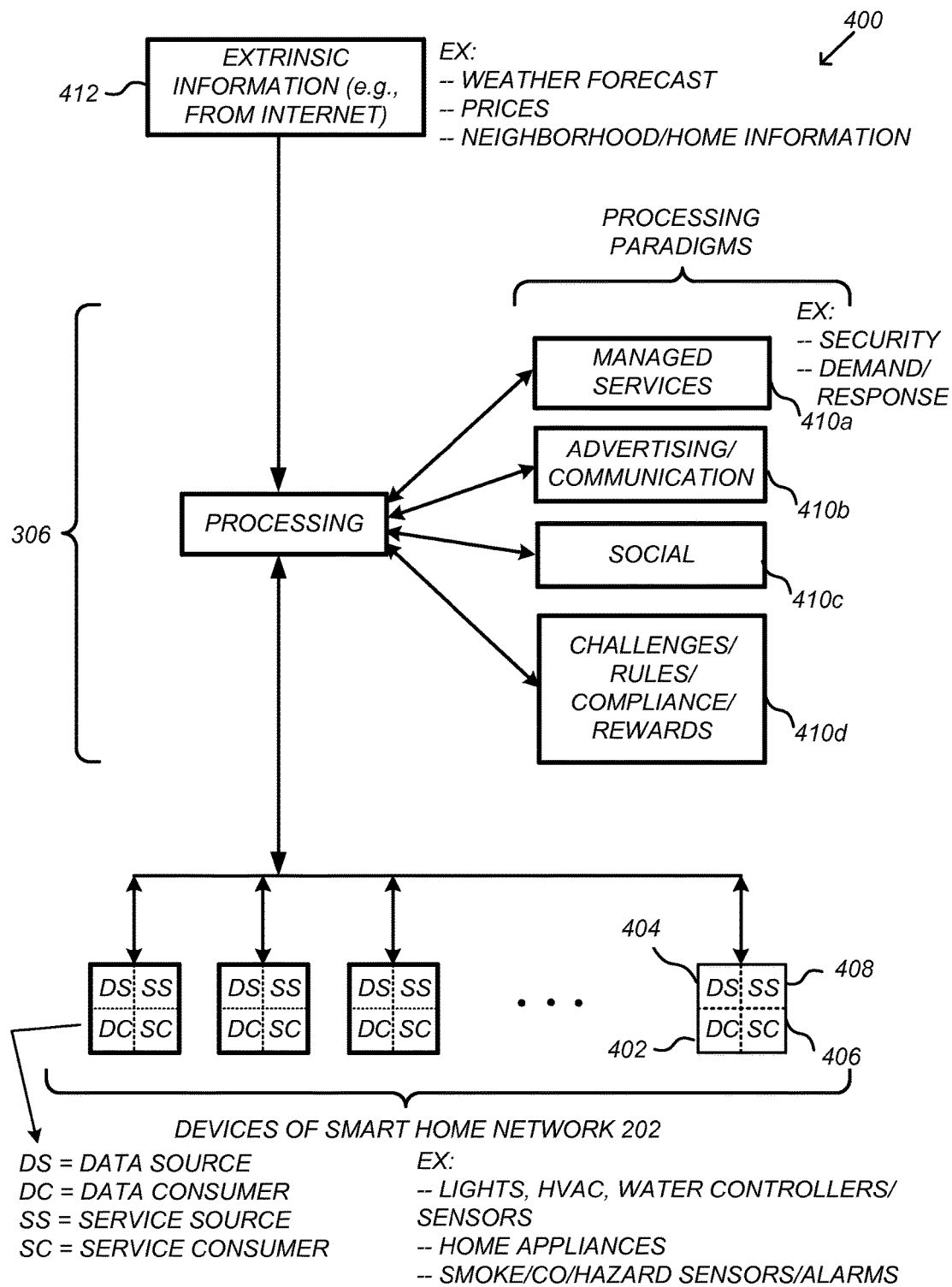
FIG. 4 illustrates an abstracted functional view of the extensible devices and services platform of FIG. 3, with reference to a processing engine as well as devices of the smart home environment, in accordance with some embodiments.

FIG. 4 illustrates an abstracted functional view 400 of the extensible devices and services platform 300 of FIG. 3, with reference to a processing engine 306 as well as devices of the smart home environment, in accordance with some embodiments. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some embodiments, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some embodiments, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some embodiments, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some embodiments, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some embodiments, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

FIG. 5 is a block diagram illustrating an exemplary smart device 204 in accordance with some embodiments (e.g., a smart hazard detector 104, such as a thermal radiation sensor) (e.g., a camera 118 or other occupancy sensor). The smart device 204 typically includes one or more processing units (processors or cores) 502, one or more network or other communications interfaces 504, memory 506, and one or more communication buses 508 for interconnecting these components. The communication buses 508 optionally include circuitry (sometimes called a chipset) that interconnects and controls communications between system components. In some embodiments, the smart device 204 includes a user interface 510. The user interface 510 may include a display device 512. In some embodiments, the device 204 includes one or more inputs 516 (e.g., input buttons, a keyboard, a mouse, and/or other inputs). In some embodiments, the smart device 204 includes a 3D gesture sensor for touchless gesture control. Alternatively or in addition, in some embodiments, the display device 512 includes a touch-sensitive surface 514, in which case the display device 512 is a touch-sensitive display. In some embodiments, the user interface 510 also includes an audio output device 518, such as speakers or an audio output connection connected to speakers, earphones, or headphones. Furthermore, some smart devices 204 use a microphone and voice recognition to supplement or replace the keyboard. Optionally, the smart device 204 includes an audio input device 520 (e.g., a microphone) to capture audio (e.g., speech from a user). Optionally, the smart device 204 includes a location detection device 521, such as a GPS (Global Positioning System), BLE (Bluetooth Low Energy), or other geo-location receiver, for determining the location of the smart device 204. The smart device 204 also optionally includes an image/video capture device 524 (e.g., a camera 118), which may serve as an occupancy sensor.

In some embodiments, the smart device 204 includes one or more thermal radiation sensors 522, directed at a heat source, that detect blackbody radiation coming from the heat source. In some embodiments, the smart device 204 includes one or more occupancy sensors 523 (e.g., in addition to or as an alternative to the image/video capture device 524). In some embodiments, the smart device 204 includes one or more ambient temperature sensors 525 (e.g., a thermometer) that measure the room temperature at the location of the smart device 204. A thermal radiation sensor 522 thus may measure the temperature of the heat source at which it is directed, while an ambient temperature sensor 525 measures the room temperature.

Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the processor(s) 502. Memory 506, or alternately the non-volatile memory device(s) within memory 506, includes a non-transitory computer readable storage medium. In some embodiments, memory 506 or the computer readable storage medium of memory 506 stores the following programs, modules and data structures, or a subset or superset thereof:

- an operating system 526 that includes procedures for handling various basic system services and for performing hardware dependent tasks;
- a network communication module 528 that is used for connecting the smart device 204 to other computers via the one or more communication network interfaces 504 (wired or wireless) and one or more communication networks, such as smart home network 202 (e.g., a mesh network), the Internet, cellular telephone networks, mobile data networks, other wide area networks, local area networks, metropolitan area networks, and so on;
- an image/video capture module 530 (e.g., a camera module) for processing a respective image or video captured by the image/video capture device 524, where the respective image or video may be sent or streamed (e.g., by a client application module 536) to the smart home network 202 and/or smart home provider server system 164;
- an audio input module 532 (e.g., a microphone module) for processing audio captured by the audio input device 520, where the respective audio may be sent or streamed (e.g., by a client application module 536) to the smart home network 202 and/or smart home provider server system 164;
- a thermal-radiation data module 534 for processing thermal-radiation data (i.e., blackbody radiation data) captured by the thermal radiation sensor 522, where the data may be sent or streamed through the smart home network 202 to a portable electronic device 166, smart home provider server system 164, other smart device 204, and/or other computing system;
- an occupancy data module 536 for processing data captured by the image/video capture device 524 and/or occupancy sensor 523, where the data may be sent or streamed through the smart home network 202 to a portable electronic device 166, smart home provider server system 164, other smart device 204, and/or other computing system;
- an ambient temperature data module 536 for processing data captured by the ambient temperature sensor 525, where the data may be sent or streamed through the smart home network 202 to a portable electronic device 166, smart home provider server system 164, other smart device 204, and/or other computing system;
- a location detection module 538 (e.g., a GPS, Wi-Fi, or hybrid positioning module) for determining the location of the smart device 204 (e.g., using the location detection device 522) and providing this location information to the smart home network 202 and/or smart home provider server system 164; and
- one or more application modules 540, including the following modules (or sets of instructions), or a subset or superset thereof:
  - a smart home module 542 for providing an interface to a smart home application (e.g., a stand-alone application or an application in communication with another device in smart home network 202 and/or smart home provider server system 164) and related features;
  - an occupancy-determination module 544 for determining occupancy of a room in the structure 150 in which the smart device 204 is located, and/or respective rooms 152 of the structure 150 (e.g., based on occupancy data received from the image/video capture device 524, the occupancy sensor 523, and/or other smart devices 204 in different rooms 152);
  - a heat-source operating-state determination module 546 to determine an operating state of a heat source (e.g., using data from the thermal radiation sensor 222 or a thermal-radiation data module 534 of another smart device 204, and/or data from the ambient temperature sensor 525 or an ambient-temperature data module 537 of another smart device 204); and/or
  - a heat-source alert module 548 to provide heat-source alerts based on the heat-source operating state (e.g., as determined by the module 546) and the occupancy (e.g., as determined by the module 544), in accordance with a heat-source alert condition 550 that may be updated dynamically based on user feedback.

FIG. 6 is a block diagram illustrating an exemplary computing system 600 in accordance with some embodiments. In some embodiments, the computing system 600 is a computer or other portable electronic device 166. In some embodiments, the computing system 600 is the smart home provider server system 164 or another server system outside of the structure 150. In some embodiments, the computing system 600 is a stand-alone controller (e.g., located in the structure 150) that is distinct from the smart devices 204 and the smart home provider server system 164. In some embodiments, the computing system 600 is a smart device 204 (e.g., with additional components as shown in FIG. 5) or a collection of multiple smart devices 204. For example, the computing system 600 may have a housing that contains the components shown in FIG. 6 and also contains a smart hazard detector 204 (e.g., a thermal radiation sensor), at least one occupancy sensor (e.g., a camera 118 or other occupancy sensor), and/or an ambient temperature sensor. In some embodiments, the computing system 600 is integrated with a heat source (e.g., in a single appliance such as a stove or oven). One or more sensors (e.g., including a thermal radiation sensor, ambient temperature sensor, and/or occupancy sensor) may be integrated with the heat source and computing system 600. For example, the computing system 600, a thermal radiation sensor, and a heat source (e.g., a stove/oven) are contained in a single enclosure.

The computing system 600 typically includes one or more processing units (processors or cores) 602, one or more network or other communications interfaces 604, memory 606, and one or more communication buses 608 for interconnecting these components. The communication buses 608 optionally include circuitry (sometimes called a chipset) that interconnects and controls communications between system components. In some embodiments, the computing system 600 includes a user interface 605 (e.g., which is analogous to the user interface 510, FIG. 5).

Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the processor(s) 602. Memory 606, or alternately the non-volatile memory device(s) within memory 606, includes a non-transitory computer readable storage medium. In some embodiments, memory 606 or the computer readable storage medium of memory 606 stores the following programs, modules and data structures, or a subset or superset thereof:

- an operating system 610 that includes procedures for handling various basic system services and for performing hardware-dependent tasks;
- a network communication module 612 that is used for connecting the computing system 600 to other computers via the one or more communication network interfaces 604 (wired or wireless) and one or more communication networks, such as smart home network 202 (e.g., a mesh network), the Internet 162, cellular telephone networks, mobile data networks, other wide area networks, local area networks, metropolitan area networks, and so on;
- a database 614 that includes the following data:
  - occupancy information 616 (e.g., received from occupancy data modules 536 in respective smart devices 204, FIG. 5);
  - thermal radiation (i.e., blackbody radiation) information 618 (e.g., received from thermal radiation data modules 534 in respective smart devices 204, FIG. 5); and/or
  - ambient-temperature information 619 (e.g., received from ambient-temperature data modules 537 in respective smart devices 204, FIG. 5).
- one or more application modules 620, including the following modules (or sets of instructions), or a subset or superset thereof:
  - an occupancy-determination module 622 for determining occupancy of the structure 150 and/or respective rooms 152 of the structure 150 (e.g., based on the occupancy information 616 in the database 614);
  - a heat-source operating-state determination module 624 to determine an operating state of a heat source (e.g., based on the thermal-radiation information 618 and/or ambient-temperature information 619 in the database 614); and/or
  - a heat-source alert module 626 to provide heat-source alerts based on the heat-source operating state (e.g., as determined by the module 624) and occupancy (e.g., as determined by the module 622), in accordance with a heat-source alert condition 628 that may be updated dynamically based on user feedback.

Each of the above identified modules and applications of FIGS. 5 and 6 corresponds to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 506 and/or 606 store a subset of the modules and data structures identified above. Furthermore, memory 506 and/or 606 optionally store additional modules and data structures not described above.

Attention is now directed towards embodiments of graphical user interfaces ("GUIs") and associated processes that may be implemented on an electronic device to present heat-source alerts and allow a user to respond to (e.g., cancel) heat-source alerts.

FIG. 7 illustrates an exemplary GUI 704 displayed on a screen 702 of a portable electronic device 166 (or other computing system, such as a smart device 204) in accordance with some embodiments. The GUI 704 illustrates aspects of operations in the methods 800 (FIG. 8) and 900 (FIGS. 9A-9B). In some embodiments, the screen 702 is an example of a user interface 605 (FIG. 6). In some embodiments, the screen 702 is an example of a display 512 (FIG. 5) of a smart device 204. In some embodiments, the GUI 704 is generated based on information from a computing system 600 (FIG. 6).

The GUI 704 displays a heat-source alert 706, which in this example indicates that the stove 112 (FIG. 1) is on and unattended. The GUI 704 also presents user-interface elements 708, 710, and/or 712 that allow the user to cancel the heat-source alert. Selection of the element 708 (e.g., through an appropriate gesture on the screen 702, such as a tap) cancels the heat-source alert 706 and indicates that the heat-source alert 706 was valid. Selection of the element 710 cancels the heat-source alert 706 and indicates that the heat-source alert 706 was a false alarm. Selection of the element 712 cancels the heat-source alert 706 and indicates that the heat-source alert 706 was valid but was late in being presented. If the heat-source alert 706 was provided by another device (e.g., a computing system 600, FIG. 6) that instructed the portable electronic device 166 to display the heat-source alert 706, user feedback associated with selection of an element 708, 710, or 712 is transmitted to that device (e.g., to the computing system 600).

FIG. 8 is a flow diagram illustrating a method 800 of providing heat-source alerts in accordance with some embodiments. Respective portions of the method 800 are performed by smart devices 204 (FIGS. 2, 5) and a computing system 600 (FIG. 6). The method 800 corresponds to instructions stored in one or more non-transitory computer-readable storage media. For example, the portions performed by smart devices 204 correspond to instructions stored in memories 506 (FIG. 5) and the portions performed by the computing system 600 correspond to instructions stored in the memory 606 (FIG. 6). Examples and details of the portion of the method 800 performed by the computing system 600 are provided below in the method 900 (FIGS. 9A-9B).

A thermal radiation sensor (e.g., a smart hazard detector 104) directed at a heat source (e.g., a stove, oven, other appliance, or fireplace) in a room (e.g., a kitchen or living room) sends (802) blackbody radiation data (e.g., indicating the temperature of the heat source), which is received (804) by the computing system 600. The computing system 600 determines (804) an operating state of the heat source based at least in part on the blackbody radiation data. For example, the computing system 600 determines whether the heat source is on or off and/or whether the temperature of the heat source satisfies (e.g., exceeds, or equals or exceeds) a threshold temperature.

In some embodiments, the computing system 600 also receives ambient temperature data for the room with the heat source from an ambient temperature sensor located in that room. The computing system 600 optionally uses the ambient temperature data in determining the operating state of the heat source.

One or more occupancy sensors (e.g., cameras 118 and/or other occupancy sensors) send (806) occupancy data for a dwelling that includes the room with the heat source. The computing system 600 receives (808) this data and determines an occupancy of the dwelling, including an occupancy of the room with the heat source. The one or more occupancy sensors thus may include an occupancy sensor in the room with the heat source. The occupancy data may or may not be received at the same time as the blackbody radiation data.

The computing system 600 determines (810) that a heat-source alert condition is met, based at least in part on the determined operating state of the heat source and the determined occupancy of the dwelling, including the occupancy of the room with the heat source. The heat-source alert condition includes a first threshold time. For example, the heat-source alert condition requires the heat source to be in a specified operating state (e.g., on) (e.g., having a temperature that satisfies a threshold) for a specified period of time while the room with the heat source has a specified occupancy state (e.g., unoccupied). The heat-source alert condition thus applies the first threshold time to both a specified operating state of the heat source and a specified occupancy state of the room or structure, in accordance with some embodiments. In some embodiments, the specified period of time is measured in minutes (e.g., is in the range of 5-15 minutes).

In response to determining (810) that the heat-source alert condition is met, the computing system 600 presents (812) or sends instructions to present a heat-source alert. In some embodiments, the operation 812 includes displaying a flashing light or other visual warning in one or more rooms, sounding an audible warning (e.g., "Check the stove" or "The stove is on and unattended") in one or more rooms, and/or sending a notification (e.g., a text message or email) to one or more occupants of the structure or to a third party (e.g., a caregiver of an occupant or a home security provider). The heat-source alert 706 (FIG. 7) is an example of such a notification.

An electronic device (e.g., a portable electronic device 166 or smart device 204) sends (814) a request to cancel the heat-source alert, based on a corresponding user input (e.g., a user input provided through the touch-sensitive surface 514 or an input 516, FIG. 5). Alternatively, the user input is provided directly to the computing system 600, through an input device of the computing system 600 (e.g., through a user interface 605).

The request may be of a first type or a second type. In some embodiments, a request of the first type results from a first type of activation of a cancel button or touch-sensitive surface, while a request of the second type results from a second type of activation of the cancel button or touch-sensitive surface. For example, the first type of activation of the cancel button or touch-sensitive surface is a press-and-hold or double-tap gesture, while the second type of activation of the cancel button or touch-sensitive surface is a single-tap gesture (or vice versa). In another example, the first type of activation is selection of the user-interface element 710 (FIG. 7), while the second type of activation is selection of the user-interface element 708 (FIG. 7). In some embodiments, requests result from touchless user gestures: a request of the first type results from a first type of user gesture in the air (e.g., a wave) while a request of the second type results from a second type of user gesture in the air (e.g., a thumbs-up gesture). In some embodiments, a request of the first type results from a first type of voice command (e.g., a user says "false alarm") while a request of the second type results from a second type of voice command (e.g., a user says "cancel"). In some embodiments, valid voice commands are limited to voice commands provided by an occupant who is determined to be in the same room as the heat source.

The computing system 600 receives (816) the request. If the request is of the first type, the computing system 600 cancels (816) the heat-source alert and modifies the heat-source alert condition. Examples of modifying the heat-source alert condition are provided below with respect to operation 926 (FIG. 9B) of the method 900. If the request is of the second type, the computing system 600 cancels (816) the heat-source alert without modifying the heat-source alert condition.

FIGS. 9A and 9B are flow diagrams illustrating a method 900 of providing heat-source alerts in accordance with some embodiments. The method 900 is performed by a computing system 600 (FIG. 6) and corresponds to instructions stored in a non-transitory computer-readable storage medium (e.g., memory 606, FIG. 6). The branch of the method 900 that assumes a "Yes" decision for operations 910/912 corresponds to the portions of the method 800 (FIG. 8) performed by the computing system 600 (FIG. 6).

The computing system 600 receives (902, FIG. 9A) blackbody radiation data from a thermal radiation sensor (e.g., a smart hazard detector 104) that is located in a room with a heat source (e.g., a stove/oven 112, other appliance, or fireplace) and is directed at the heat source. The computing system 600 determines (904) an operating state of the heat source in the room based at least in part on the received blackbody radiation data. For example, the computing system 600 determines whether the heat source is on or off and/or whether the temperature of the heat source satisfies (e.g., exceeds, or equals or exceeds) a threshold temperature.

In some embodiments, the computing system 600 also receives ambient temperature data for the room with the heat source from an ambient temperature sensor located in that room. The computing system 600 optionally uses the ambient temperature data in determining the operating state of the heat source.

The computing system 600 also receives (906) occupancy data (e.g., from one or more cameras 118 and/or other occupancy sensors) for a dwelling that includes the room with the heat source. The computing system 600 determines (908) an occupancy of the dwelling, including an occupancy for the room with the heat source, based on the received occupancy data.

The computing system 600 determines (910) whether a heat-source alert condition is met, based at least in part on the operating state of the heat source and the occupancy of the dwelling, including the occupancy of the room with the heat source. The heat-source alert condition includes a first threshold time. For example, the heat-source alert condition requires the heat source to be in a specified operating state (e.g., on) (e.g., having a temperature that satisfies a threshold) for a specified period of time while the room with the heat source has a specified occupancy state (e.g., unoccupied). The heat-source alert condition thus applies the first threshold time to both a specified operating state of the heat source and a specified occupancy state of the room or structure, in accordance with some embodiments. In some embodiments, the specified period of time is measured in minutes (e.g., is in the range of 5-15 minutes).

If the heat-source alert condition is met (912—Yes), the computing system 600 presents (916) or sends instructions to present a heat-source alert. If the heat-source alert condition is not met (912—No), the computing system 600 does not present or send instructions to present a heat-source alert (i.e., foregoes presenting or sending instructions to present a heat-source alert). Examples of heat-source alerts are described with respect to operation 812 of the method 800 (FIG. 8).

Once a heat-source alert has been presented, or corresponding instructions sent, the computing system 600 may receive (918) a request to cancel the heat-source alert. Examples of requests are described with respect to operation 814 of the method 800 (FIG. 8). The request may be of a first type or second type. If the request is of the second type (920—2nd type), the computing system 600 cancels (922) the heat-source alert and leaves the heat-source alert condition unmodified. If the request is of the first type (922—1st type), the computing system 600 cancels (924, FIG. 9B) the heat-source alert and modifies (926) the heat-source alert condition.

In some embodiments, modifying the heat-source alert condition includes changing (928) the first threshold time to a second threshold time that is greater than the first threshold time and/or changing (930) a first threshold temperature to a second threshold temperature that is greater than the first threshold temperature. A request of the first type may indicate that the heat-source alert is a false alarm, while a request of the second type may indicate that the heat-source alert was appropriate and proper. The threshold temperature and/or threshold time may be increased in response to a request of the first type to reduce the likelihood of future false alarms occurring. The heat-source alert condition thus may be tightened in response to requests of the first type, but not in response to requests of the second type.

Alternatively, in some embodiments modifying the heat-source alert condition includes changing the first threshold time to a second threshold time that is less than the first threshold time and/or changing the first threshold temperature to a second threshold temperature that is less than the first threshold temperature. A request of the first type may indicate that a proper heat-source alert has been provided, but later than it should have been, while a request of the second type may indicate that the heat-source alert was appropriate and proper. The threshold temperature and/or threshold time may be decreased in response to a request of the first type to ensure that future heat-source alerts will be more prompt. The heat-source alert condition thus may be relaxed in response to requests of the first type, but not in response to requests of the second type.

In some embodiments, the request may be of a first type, second type, or third type. In one example, requests of the first, second, and third types correspond to selection of the user-interface elements 710, 708, and 712 (FIG. 7), respectively. A request of the first type indicates that the heat-source alert is a false alarm; in response, the computing system 600 tightens the heat-source alert condition (e.g., increases the threshold temperature from the first threshold temperature to a second, higher threshold temperature and/or increases the threshold time from the first threshold time to a second, higher threshold time). A request of the second type indicates that the heat-source alert was proper and timely; in response, the computing system 600 does not modify the heat-source alert condition. A request of the third type indicates that the heat-source alert was proper but late; in response, the computing system 600 relaxes the heat-source alert condition (e.g., decreases the threshold temperature from the first threshold temperature to a second, lower threshold temperature and/or decreases the threshold time from the first threshold time to a second, lower threshold time).

In some embodiments, modifying the heat-source alert condition includes associating (932) a pattern of sensed household activity with the request to cancel the heat-source alert and changing (934) the heat-source alert condition to additionally require an absence of the pattern.

Associating (932) the pattern of sensed household activity with the request to cancel the heat-source alert may include monitoring the occupancy (i.e., an occupancy condition) in each room (or one or more rooms) adjacent to the room with the heat source and monitoring a state of at least one device in each adjacent room (or one or more adjacent rooms) that is occupied (i.e., for which occupancy is detected). For example, the computing system 600 detects movement of an occupant from the room with the heat source to an adjacent room and detects corresponding activation of a device (e.g., a television) in the adjacent room (e.g., such that the device is activated upon entry of the occupant into the adjacent room or within a predefined time after entry). The computing system 600 also receives information regarding a category of the activated device (e.g., information specifying that the device is a television). In response, the computing system 600 modifies the heat-source alert condition to preclude generation of a heat-source alert, even if all other requirements of the heat-source alert condition are satisfied. The computing system 600 thus may adapt, for example, to the desire of an occupant to watch television in a room adjacent to the kitchen while food cooks on the stove or in the oven. The occupant might find a heat-source alert provided in this situation to be an annoyance.

The method 900 may be performed repeatedly. In some embodiments, the request received in operation 918 may be of the first type in some iterations of the method 900 and of the second type in other iterations of the method 900. For example, a request of a first type may be received (918) during a first iteration of the method 900, in response to a first heat-source alert resulting from a first determination that the heat-source alert condition is met, with the operations 924 and 926 being performed accordingly. A request of a second type may be received (918) during a second iteration of the method 900, in response to a second heat-source alert resulting from a second determination that the heat-source alert condition is met, with the operation 922 being performed accordingly.

In some embodiments, the request received in operation 918 may be of the first type in some iterations of the method 900, of the second type in other iterations of the method 900, and of the third type in still other iterations of the method 900. In different iterations of the method 900, the heat-source alert condition would be tightened in response to requests of the first type, left unmodified in response to requests of the second type, and relaxed in response to requests of the third type. Respective heat-source alerts would be canceled regardless of the type of the request.

For situations in which the systems discussed above collect information about users, the users may be provided with an opportunity to opt in/out of programs or features that may collect personal information (e.g., information about a user's preferences or usage of a smart device). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at a computing system comprising one or more processors and memory coupled to the one or more processors:
      receiving blackbody radiation data from a thermal radiation sensor;
      determining an operating state of a heat source based at least in part on the received blackbody radiation data;
      determining an occupancy of a dwelling that includes the heat source;
      determining, based at least in part on the determined operating state of the heat source and the determined occupancy of the dwelling whether a heat-source alert condition is met, wherein the heat-source alert condition includes a first threshold time;
      in accordance with a determination that the heat-source alert condition is met, presenting or sending instructions to present a heat-source alert;
      after presenting or sending the instructions to present the heat-source alert, receiving a request to cancel the heat-source alert; and
      in response to receiving the request to cancel the heat-source alert:
         determining a request type of the cancel request, wherein there are a plurality of request types, including a first request type classifying the heat-source alert as a false alarm and a second request type classifying the heat-source alert as a valid alarm; and
         cancelling the heat-source alert; and
         in accordance with the determination that the cancel request has the first request type, modifying the heat-source alert condition for future heat-source alerts.

2. The method of claim 1, wherein modifying the heat-source alert condition includes changing the first threshold time to a second threshold time that is greater than the first threshold time.

3. The method of claim 1, wherein modifying the heat-source alert condition includes changing a first threshold temperature to a second threshold temperature that is greater than the first threshold temperature.

4. The method of claim 1, including:
   in accordance with a determination that the heat-source alert condition is not met, forgoing presenting or sending instructions to present the heat-source alert.

5. The method of claim 1, wherein the determination that the heat-source alert condition is met is a first determination and the heat-source alert is a first heat-source alert, the method further comprising:
   in accordance with a second determination that the heat-source alert condition is met, presenting or sending instructions to present a second heat-source alert;
   after presenting or sending instructions to present the second heat-source alert, receiving a request of the second type to cancel the second heat-source alert; and
   in response to receiving the request of the second type to cancel the second heat-source alert, cancelling the second heat-source alert without modifying the heat-source alert condition.

6. The method of claim 1, further comprising:
   receiving ambient temperature data for a room with the heat source from an ambient temperature sensor located in the room with the heat source; and
   determining the operating state of the heat source in the room based at least in part on the received ambient temperature data.

7. The method of claim 1, wherein modifying the heat-source alert condition comprises:
   associating a pattern of sensed household activity with the request to cancel the heat-source alert; and
   changing the heat-source alert condition to additionally require an absence of the pattern.

8. The method of claim 7, wherein associating the pattern of sensed household activity with the request to cancel the heat-source alert comprises:
   monitoring an occupancy condition in each room adjacent to a room with the heat source; and
   monitoring a state of at least one device in each adjacent room for which occupancy is detected.

9. The method of claim 8, wherein associating the pattern of sensed household activity with the request to cancel the heat-source alert comprises:
   detecting movement of an occupant from the room with the heat source to a respective adjacent room;
   detecting activation of a respective device in the respective adjacent room within a predefined time after the occupant has moved from the room with the heat source to the respective adjacent room; and
   receiving information regarding a category of the respective device;
   wherein a subsequent activation of a device of said category within the predefined time after movement of the occupant from the room with the heat source to the respective adjacent room will preclude the heat-source alert condition from being met.

10. The method of claim 1, wherein a housing that contains the computing system also contains the thermal radiation sensor.

11. The method of claim 1, wherein the computing system, the thermal radiation sensor, and the heat source are contained in a single enclosure.

12. The method of claim 1, wherein the computing system is located in the dwelling at a separate location from the thermal radiation sensor.

13. The method of claim 1, wherein the computing system is located in a server system remote from the dwelling.

14. A computing system, comprising:
one or more processors; and
memory storing one or more programs configured to be executed by the one or more processors,
the one or more programs comprising instructions for:
receiving blackbody radiation data from a thermal radiation sensor;
determining an operating state of a heat source based at least in part on the received blackbody radiation data;
determining an occupancy of a dwelling;
determining, based at least in part on the determined operating state of the heat source and the determined occupancy of the dwelling whether a heat-source alert condition is met, wherein the heat-source alert condition includes a first threshold time;
presenting or sending instructions to present a heat-source alert, in accordance with a determination that the heat-source alert condition is met;
receiving a request to cancel the heat-source alert after presenting or sending instructions to present the heat-source alert; and
in response to receiving the request to cancel the heat-source alert,
determining a request type of the cancel request, wherein there are a plurality of request types, including a first request type classifying the heat-source alert as a false alarm and a second request type classifying the heat-source alert as a valid alarm; and
cancelling the heat-source alert; and
in accordance with the determination that the cancel request has the first request type, modifying the heat-source alert condition for future heat-source alerts.

15. A non-transitory computer-readable storage medium storing one or more programs, the one or more programs comprising instructions, which when executed by a computing system, cause the computing system to:
receive blackbody radiation data from a thermal radiation sensor;
determine an operating state of a heat source based at least in part on the received blackbody radiation data;
determine an occupancy of a dwelling;
determine, based at least in part on the determined operating state of the heat source and the determined occupancy of the dwelling whether a heat-source alert condition is met, wherein the heat-source alert condition includes a first threshold time;
present or send instructions to present a heat-source alert, in accordance with a determination that the heat-source alert condition is met;
receive a request to cancel the heat-source alert after presenting or sending instructions to present the heat-source alert;
in response to receiving the request to cancel the heat-source alert,
determine a request type of the cancel request, wherein there are a plurality of request types, including a first request type classifying the heat-source alert as a false alarm and a second request type classifying the heat-source alert as a valid alarm; and
cancel the heat-source alert; and
in accordance with the determination that the cancel request has the first request type, modify the heat-source alert condition for future heat-source alerts.

16. The system of claim 14, wherein modifying the heat-source alert condition includes at least one of:
changing the first threshold time to a second threshold time that is greater than the first threshold time; and
changing a first threshold temperature to a second threshold temperature that is greater than the first threshold temperature.

17. The system of claim 14, wherein the determination that the heat-source alert condition is met is a first determination and the heat-source alert is a first heat-source alert, and wherein the one or more programs further comprise instructions for:
presenting or sending instructions to present a second heat-source alert, in accordance with a second determination that the heat-source alert condition is met;
receiving a request of the second type to cancel the second heat-source alert, after presenting or sending instructions to present the second heat-source alert; and
cancelling the second heat-source alert without modifying the heat-source alert condition in response to receiving the request of the second type to cancel the second heat-source alert.

18. The non-transitory computer-readable storage medium of claim 15, wherein modifying the heat-source alert condition includes at least one of:
changing the first threshold time to a second threshold time that is greater than the first threshold time; and
changing a first threshold temperature to a second threshold temperature that is greater than the first threshold temperature.

19. The non-transitory computer-readable storage medium of claim 15, wherein the determination that the heat-source alert condition is met is a first determination and the heat-source alert is a first heat-source alert, and wherein the one or more programs further comprise instructions, which when executed by the computing system, cause the computing system to:
present or send instructions to present a second heat-source alert, in accordance with a second determination that the heat-source alert condition is met;
receive a request of the second type to cancel the second heat-source alert, after presenting or sending instructions to present the second heat-source alert; and
cancel the second heat-source alert without modifying the heat-source alert condition in response to receiving the request of the second type to cancel the second heat-source alert.

20. The method of claim 1, wherein the cancel request of the first type is selected by a user following the presenting or sending from among a group of cancel request options that includes the first type and another type of the plurality of request types.

* * * * *